United States Patent [19]

Matovich

[11] 4,036,181
[45] July 19, 1977

[54] HIGH TEMPERATURE FLUID-WALL REACTORS FOR TRANSPORTATION EQUIPMENT

[75] Inventor: Edwin Matovich, Brea, Calif.

[73] Assignee: Thagard Technology Company, Irvine, Calif.

[21] Appl. No.: 649,964

[22] Filed: Jan. 19, 1976

Related U.S. Application Data

[63] Continuation-in-part of Ser. No. 271,560, July 13, 1972, Pat. No. 3,933,434, and Ser. No. 591,949, June 30, 1975, and Ser. No. 591,950, June 30, 1975, and Ser. No. 606,222, Aug. 20, 1975, and Ser. No. 616,393, Sept. 24, 1975, and Ser. No. 631,912, Nov. 14, 1975.

[51] Int. Cl.² .......................................... F02B 43/00
[52] U.S. Cl. ................................ 123/3; 23/252 R; 23/288 J; 23/281; 48/103; 48/196 R; 123/119 E; 123/122 F; 290/2
[58] Field of Search ............... 23/252 R, 259.5, 288 J; 48/102 A, 196 R, 214 A, 214, DIG. 5, 103; 123/119 F, 122 E, 3, DIG. 12; 290/2

[56] References Cited

U.S. PATENT DOCUMENTS

| 1,630,048 | 5/1927 | Balachowsky et al. ..... 23/288 J UX |
| 2,062,358 | 12/1936 | Frolich .................... 48/196 R X |
| 2,206,189 | 7/1940 | Hillhouse ........................ 48/214 R |
| 3,492,457 | 1/1970 | Subt ................................ 123/122 F |
| 3,717,129 | 2/1973 | Fox ............................... 123/DIG. 12 |
| 3,719,454 | 3/1973 | Shang .............................. 23/252 R |
| 3,792,690 | 2/1974 | Cooper ........................... 123/119 E |

*Primary Examiner*—James H. Tayman, Jr.
*Attorney, Agent, or Firm*—Pennie & Edmonds

[57] ABSTRACT

A fuel converter for a transportation vehicle includes a fuel container for a hydrocarbon fuel, an auxiliary container for water or for an inert fluid which is substantially transparent to radiant energy, an electrical power source, and a high temperature fluid-wall reactor. The high temperature fluid-wall reactor has at least one input for the hydrocarbon fuel and for water or the inert fluid, an electrical power input, and an output. Means are provided for metering the hydrocarbon fuel, water or the inert fluid, and electrical power into the appropriate inputs of the reactor. A manifold connects the output of the reactor to a combustion fuel input of the engine of the vehicle. By means of the fuel converter, a variety of low grade and inexpensive hydrocarbon fuels may be converted into combustible mixtures such as carbon black and hydrogen or carbon monoxide and hydrogen which are suitable as fuel for an internal combustion engine. The level of hydrocarbon pollutants in the exhaust of the engine is substantially reduced relative to the exhaust from the engine when burning an unmodified hydrocarbon fuel.

8 Claims, 3 Drawing Figures

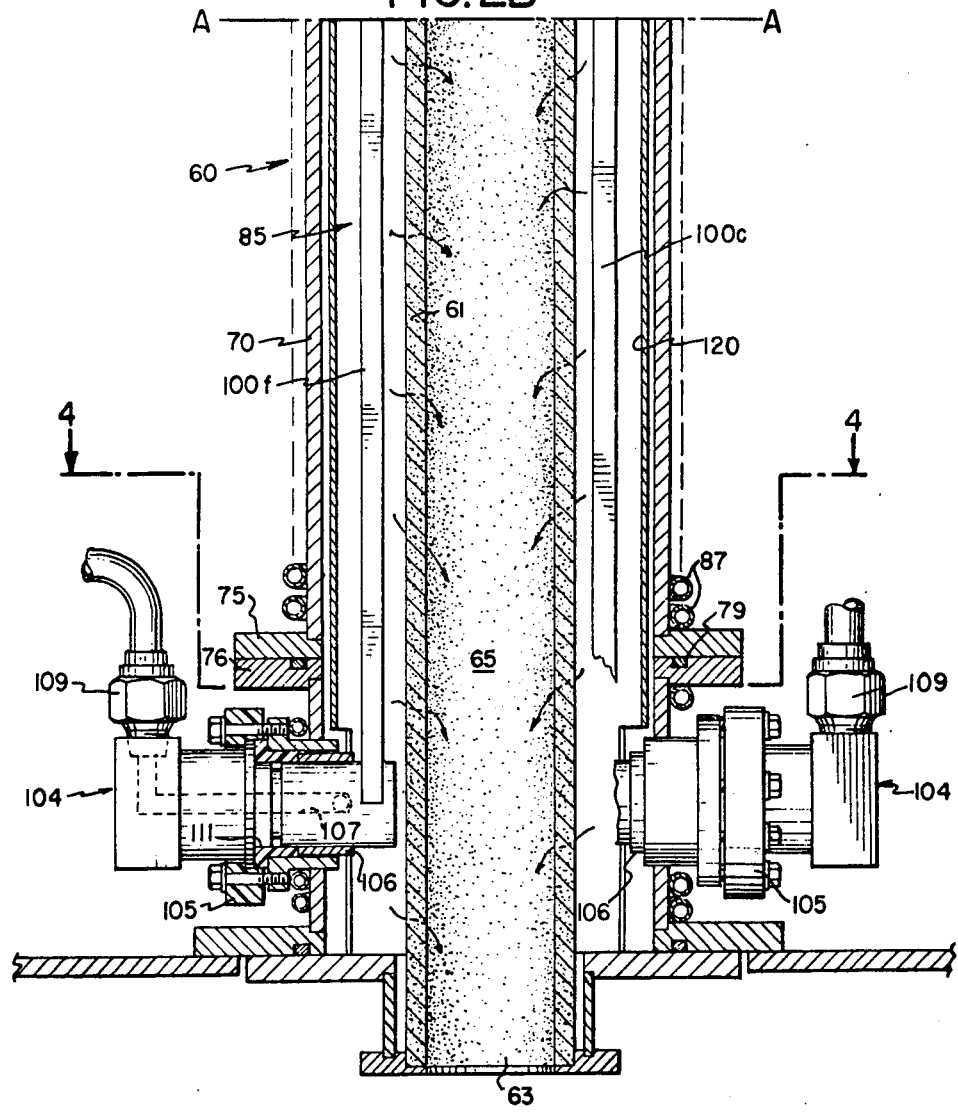

HIGH TEMPERATURE FLUID-WALL REACTORS FOR TRANSPORTATION EQUIPMENT

CROSS-REFERENCE TO RELATED APPLICATIONS

This application is a continuation-in-part of my copending applications Ser. No. 271,560, filed July 13, 1972, now U.S. Pat. No. 3,933,434; Ser. No. 591,949, filed June 30, 1975; Ser. No. 591,950; filed June 30, 1975; Ser. No. 606,222, filed Aug. 20, 1975; Ser. No. 616,393, filed Sept. 24, 1975; and Ser. No. 631,912, filed Nov. 14, 1975.

FIELD OF THE INVENTION

The present invention relates to a compact fuel converter which incorporates a high temperature fluid-wall reactor for converting a variety of hydrocarbon fuels into combustible mixtures for use in internal combustion engines which power transportation equipment such as automobiles and trucks.

BACKGROUND OF THE INVENTION

The internal-combustion engines generally used today to power automobiles and trucks have a number of widely-recognized disadvantages. One problem with these engines is that many properties of the fuel they burn must fall within narrow limits for the engine to operate. For example, an automobile engine designed to run on gasoline with a high octane rating generally runs inefficiently or not at all if it is fueled with a low-octane gasoline. Natural petroleum must therefore be extensively processed in a refinery in order to produce gasolines and diesel fuels having the specific properties required to fuel automobile and truck engines.

A further drawback of internal combustion engines presently used to power transportation equipment is that the fuels they require must be highly volatile and are therefore a source of air pollution. Hydrocarbon vapors escaping into the atmosphere from these fuels constitute such a significant air pollution problem that new automobiles are generally required to have vapor recovery systems connected to their fuel tanks in order to reduce the amount of gasoline vapor which evaporates into the atmosphere. The problem of hydrocarbon vapors escaping into the atmosphere from the fuel systems of automobiles and trucks could be substantially eliminated if fuels of low volatility could be used. However, the use of such fuels has heretofore been considered impractical for automobile and truck engines.

SUMMARY OF THE INVENTION

The fuel converter of the present invention can convert hydrocarbon fuels and water into combustible synthesis gas mixtures containing carbon monoxide and hydrogen which are suitable as fuels for internal combustion engines used in transportation equipment. Such a fuel converter preferably includes a fuel container for a hydrocarbon fuel, a tank for water, an inert-fluid tank for an inert fluid which is substantially transparent to radiant energy, and an electrical power source. The fuel converter further includes a high temperature fluid-wall reactor for converting the hydrocarbon fuel and water into a synthesis gas mixture containing carbon monoxide and hydrogen. The reactor has at least one input for the hydrocarbon fuel and water, an inert-fluid input for an inert fluid which is substantially transparent to radiant energy for forming the fluid wall of the reactor, an electrical power input, and a gas mixture output and is preferably one of the reactors disclosed in my copending applications referenced above. Means are provided for metering fuel from the fuel container into the fuel input of the reactor, for metering water from the water tank into the water input of the reactor, for metering inert fluid from the inert fluid tank into the inert fluid input of the reactor, and for metering electrical power from the power source into the power input of the reactor. A gas manifold connects the gas mixture output of the reactor to a combustion fuel input of the internal combustion engine of the transportation vehicle for directing the synthesis gas mixture from the reactor to the engine. In certain embodiments of the high temperature fluid-wall reactor, water in the form of steam can serve as the fluid wall. A fuel converter incorporating such a reactor does not require a separate inert-fluid tank, inert-fluid input for the reactor, and means for metering the inert fluid; these functions being provided by the water tank, water input, and means for metering water.

Fuel converters of the present invention may also be used to thermally decompose a hydrocarbon fuel into a combustion fuel mixture containing carbon black and hydrogen. For this application the fuel converter preferably includes a fuel container for a hydrocarbon fuel, an inert-fluid tank for an inert fluid which is substantially transparent to radiant energy, and an electrical power source. The converter further includes a high temperature fluid-wall reactor for thermally decomposing the hydrocarbon fuel into a combustion fuel mixture containing carbon black and hydrogen. The reactor has a fuel input, an inert-fluid input for the inert fluid forming the fluid wall of the reactor, an electrical power input, and a fuel mixture output. The converter further includes means for metering fuel from the fuel container into the fuel input of the reactor, means for metering inert fluid from the inert-fluid tank into the inert fluid input of the reactor, and means for metering electrical power from the power source into the power input of the reactor. A fuel mixture manifold connected to the fuel mixture output of the reactor and to a combustion fuel input of the internal combustion engine directs the combustion fuel mixture from the reactor to the engine. This embodiment of the invention has the advantage that the added weight of a water tank and water are not required.

Fuel converters of the present invention incorporate high temperature fluid-wall reactors, preferably those disclosed in my copending applications referenced above. Such a preferred reactor can include a tube having an inlet and an outlet end, the interior of the tube defining a reactor chamber. Means for introducing an inert fluid into the reactor chamber provide a protective blanket for the radially inward surface of the reactor tube. Means for introducing at least one reactant into the reactor chamber through the inlet end cause such reactants to be directed in a predetermined path axially of the reactor tube. The inert fluid blanket confines the reactants substantially centrally within the reactor chamber and out of contact with the reactor tube. High intensity radiant energy is generated and directed into the reactor chamber to coincide with at least a portion of the path of the reactants, sufficient radiant energy being absorbed to raise the temperature of the reactants to a level required to initiate the desired fuel conversion reaction.

The fuel converter of the present invention can convert a wide variety of hydrocarbon fuels into combustion fuel mixtures whose combustion properties are sufficiently uniform to permit them to be used to fuel a single internal combustion engine without requiring significant returning of the engine. Thus, for example, an automobile equipped with a fuel converter of the present invention can utilize gasolines of different octane ratings as well as petroleum oils which are far less expensive. Moreover, high-boiling hydrocarbons, even those which are normally solid at ambient temperature, may be employed as fuels with the present invention. Such hydrocarbons are relatively non-volatile compared to gasoline and thus their storage in transportation equipment creates less of an air pollution problem.

An internal combustion engine fueled by a synthesis gas mixture or carbon black and hydrogen from a fuel converter of the present invention is expected to have low hydrocarbon emissions from its exhaust since no hydrocarbons need be present in the fuel mixture burned by the engine, in which case no hydrocarbons can pass through the engine unburned or incompletely burned.

Fuel converters of the present invention are light and compact enough to be carried on board automobiles and trucks. They can be used to process fuel for piston engines, "Wankel" engines, and gas turbines.

BRIEF DESCRIPTION OF THE DRAWINGS

FIG. 2B is an elevation in section of the outlet end of the high temperature fluid-wall reactor;

FIGS. 2A and 2B represent halves of an integral structure which has been divided along line A—A in order to provide an illustration of sufficient size to show clearly certain structural details.

DESCRIPTION OF THE PREFERRED EMBODIMENTS

Figure 1:
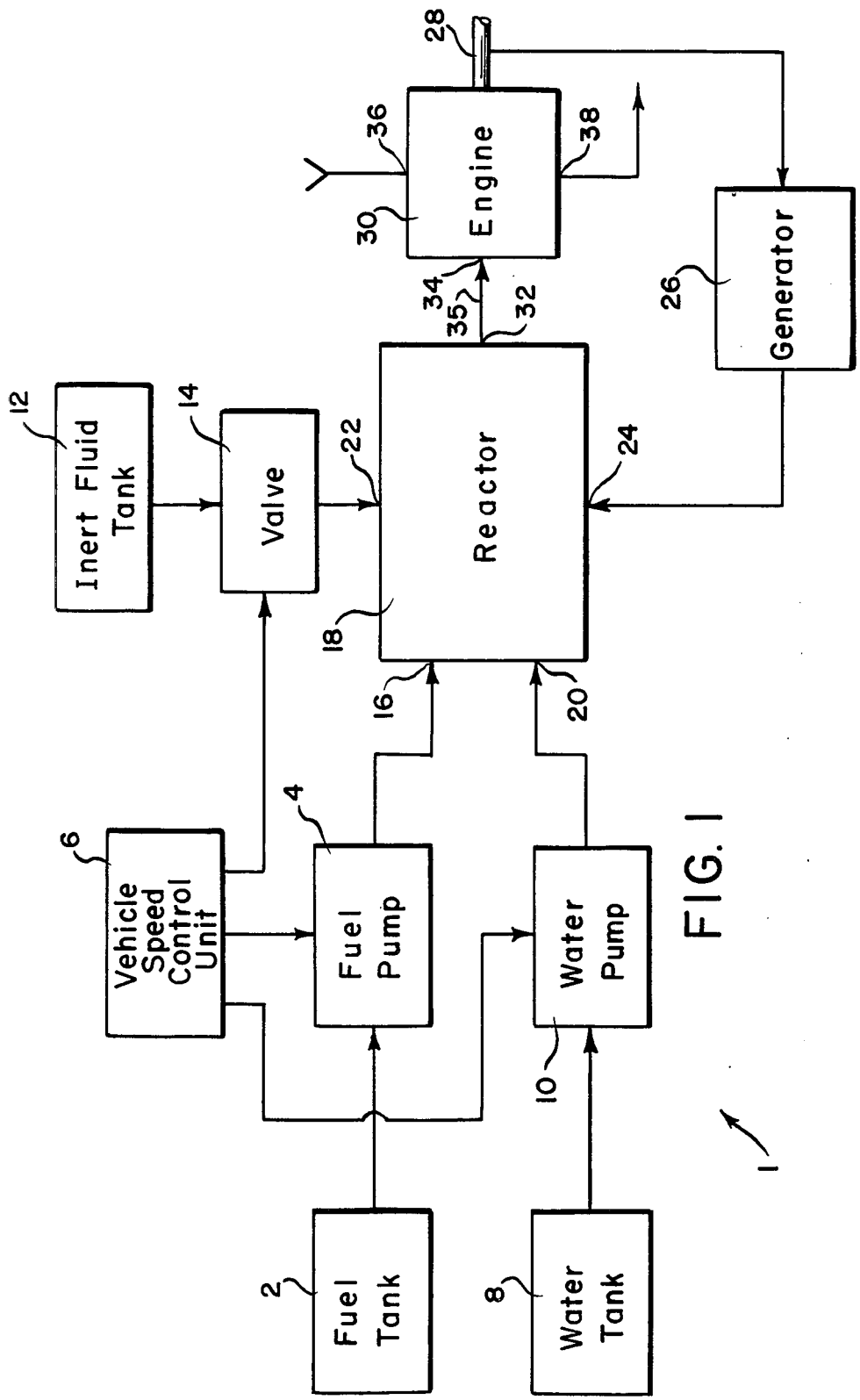
FIG. 1 is a block diagram of the fuel converter of the present invention together with an internal combustion engine.

Referring now to FIG. 1 a block diagram of the fuel converter 1 of the present invention is shown. A tank 2 for a hydrocarbon fuel feeds a fuel pump 4 which is controlled by a vehicle speed control unit 6. A water tank 8 is connected to a water pump 10 which is also controlled by the speed control unit 6. An inert fluid tank 12 for an inert fluid which is substantially transparent to radiant energy is connected to an inert fluid valve 14 which is controlled by the vehicle system control unit 6. The fuel pump 4 is connected to a fuel input 16 of a high temperature fluid-wall reactor 18. The water pump 10 and the inert fluid valve 14 are connected respectively to a water input 20 and an inert fluid input 22 of the reactor 18. An electrical power input 24 of the reactor 18 is connected to an electrical generator 26 which is driven by a power shaft 28 of an internal combustion engine 30. A gas output 32 of the reactor 18 is connected to a combustion fuel input 34 by a manifold 35 of engine 30. Engine 30 has an air intake 36 and an exhaust 38. The internal combustion engine 30 is of standard design and therefore its features are not shown.

Figure 2A:
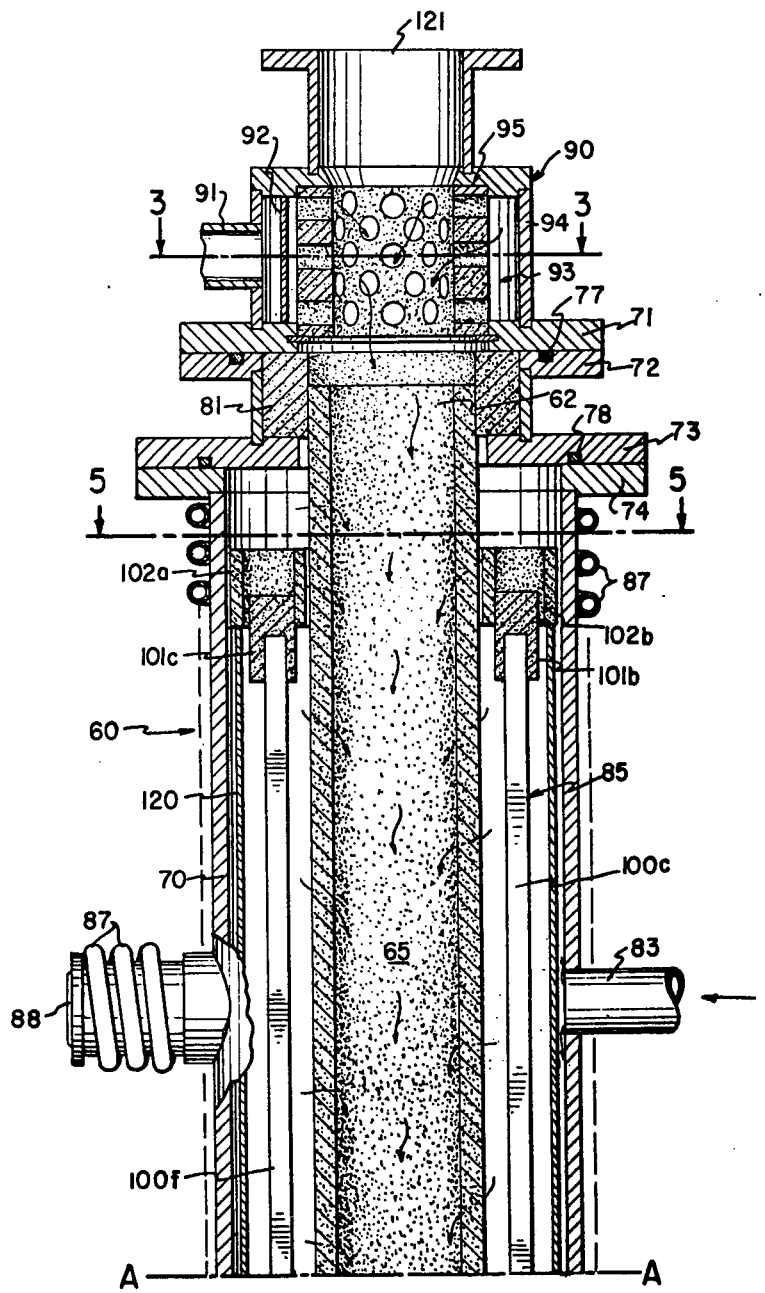
FIG. 2A is an elevation in section of the inlet end of a high temperature fluid-wall reactor.

The high temperature fluid-wall reactor 18 of FIG. 1 is shown in a cross sectional view in FIGS. 2A and 2B. This figure is identical to FIGS. 2A and 2B of my co-pending U.S. patent application Ser. No. 271,560, filed July 13, 1972 and now U.S. Pat. No. 3,933,434. This reactor is described in detail in such application which is hereby incorporated by reference in the present application.

In summary, the reactor of FIG. 2A and 2B has a reactor tube 61 having an inlet end 62 and an outlet end 63. The interior of the tube 61 defines a reactor chamber 65. The reactor tube is made of a porous refractory material such as carbon or graphite capable of emitting sufficient radiant energy to raise the temperature of reactants within the reactor tube 61 to a level required to initiate and sustain the desired fuel conversion reaction. The pores of the refractory material are of such diameter as to permit a uniform flow of sufficient inert fluid through the tube wall to constitute a protective blanket for the radially inward surface of the reactor tube 61. A fluid-tight, tubular pressure vessel 70 encloses the reactor tube 61 and the pressure vessel 70. The inlet end 62 and the outlet end 63 are sealed from the plenum 85. The pressure vessel 70 has an inlet 83 for admitting the inert fluid, which is directed under pressure into the plenum 85 and through the porous tube wall 71 into the reactor chamber 65. The fuel input 16 and the water input 20 of the reactor 18 are connected to the inlet end 62 of the reactor tube 61. The outlet end 63 of the reactor tube 61 is connected to the gas mixture output 32. The inert fluid input 22 is connected to the inlet 83 of the pressure vessel 70. Means for introducing the hydrocarbon fuel and water into the reactor chamber 65 through the inlet end 62 of the reactor tube 61 include an inlet section 90 adjacent the inlet end 62 of the tube 61. The reactants are directed in a predetermined path axially of the reactor tube and are confined by the protective blanket substantially centrally within the reactor chamber 65 and out of contact with the inner wall of the reactor tube 61. The reactor tube 61 generates high intensity radiant energy which is directed centrally there within substantially coincident with at least a portion of the path of the reactants. Heating is provided by a plurality of carbon electrodes 100a–100f which are disposed radially outwardly of the reactor tube 61. The reactor tube 61 is heated to a temperature level at which it emits sufficient radiant energy to initiate and sustain the reaction of the water and the hydrocarbon fuel to form a synthesis gas mixture containing carbon monoxide and hydrogen. A circumferential molybdenum heat shield 120 is disposed in the pressure vessel 70 and radially outwardly of the carbon electrodes 100a–100f. The heat shield reflects radiant energy toward the reactor tube 61.

The inert fluid contained in inert fluid tank 12 is used to form the fluid wall of reactor 18. The inert fluid is substantially transparent to radiation, i.e., has a low coefeficient of absorption ($a$). Nitrogen or hydrogen are suitable inert fluids; nitrogen being preferred because it is not flammable. The term "inert" refers to the lack of reactivity of the inert fluid towards the material of which reactor tube 61 is composed. Thus the inert fluid can in fact be one of the reactants in the fuel conversion reaction. For example, steam may be used as the inert fluid forming the fluid wall provided the reactor tube is composed of a material such as aluminum oxide which does not react appreciably with steam. If steam is used for the fluid wall, the inert-fluid tank 12, the valve 14, and the inert fluid input 22 of the reactor 18 are not required.

Fuel converters of the present invention may be used to carry out a number of fuel conversion reactions for producing fuel mixtures suitable for internal combustion engines. For example, hydrocarbon fuels may be reformed with steam to produce synthesis gas mixtures containing hydrogen and carbon monoxide. Since this class of reactions, generally termed watergas reactions, are endothermic, it may be advantageous to admix a limited quantity of molecular oxygen or air with the water and hydrocarbon in the reactor in order to reduce the power requirements of the reactor. The hydrocarbon and oxygen react exothermically to produce carbon monoxide, thus generating heat which can be used in the endothermic water-gas reaction. Fuel converters of the present invention may also be used to thermally decompose hydrocarbon fuels into a combustible fuel mixture of carbon black and hydrogen. For this reaction, the water tank 8, water pump 10, and water input 20 in FIG. 1 are of course not required.

Carbon black produced in high temperature fluid-wall reactors is extremely light and fine. It may be entrained in a stream of gas and thus readily carried to the combustion chambers of a piston engine. The suitability of such carbon black as a fuel for a piston engine was demonstrated in an experiment in which carbon black produced by decomposing a hydrocarbon in the reactor of FIGS. 2A and 2B was aspirated into the fuel intake of a single-piston, four-cycle gasoline engine. The engine ran for a time on the carbon black fuel, although eventually the spark plug becaume fouled and had to be cleaned.

The fuel converter of the present invention may be used to process virtually any hydrocarbonaceous material, be it solid, liquid, or gas. As noted above, it will in general be preferred to use hydrocarbons of low volatility in order to reduce air pollution problems. Certain of such nonvolatile hydrocarbons can be mixed with water to form stable emulsions or slurries. These hydrocarbon/water mixtures may then be introduced into a fluid-wall reactor to produce a synthesis gas mixture. In this event, a separate tank, pump, and input for water are not required.

The power requirements of fuel converters of the present invention are reduced if the hydrocarbon fuel and other reactants such as water are preheated before introducing them into the fluid-wall reactor. Such preheating may be accomplished with a heat exchanger which is heated by the coolant water of the internal combustion engine or by the exhaust from the engine.

Detailed descriptions of high temperature fluid-wall reactors which are suitable for incorporation in fuel converters of the present invention can be found in my earlier copending patent application Ser. No. 271,560, filed July 13, 1972; Ser. No. 606,222, filed Aug. 20, 1975; and Ser. No. 631,912, filed Nov. 14, 1975. The disclosures of these applications are hereby incorporated by reference in the present application.

I claim:
1. A fuel converter for a transportation vehicle powered by an internal combustion engine comprising:
   a. a container for a hydrocarbon fuel;
   b. a tank for water;
   c. an electrical power source;
   d. a high temperature fluid-wall reactor for converting the hydrocarbon fuel and water into a synthesis gas mixture containing carbon monoxide and hydrogen, the reactor having (d.1) a hydrocarbon fuel input, (d.2) a water input, (d.3) an electrical power input, (d.4) a reactor tube having an inlet end and an outlet end, the interior of the tube defining a reactor chamber, (d.5) means for generating an annular envelope of an inert fluid which is substantially transparent to radiation radially inwardly of the inner surface of the reactor tube to constitute a protective blanket for the inner surface, (d.6) means connected to the hydrocarbon fuel input for introducing the hydrocarbon fuel into the reactor chamber through the inlet end of the reactor tube in a predetermined path axially of the reactor tube, the hydrocarbon fuel being confined by the protective blanket substantially centrally within the reactor chamber and out of contact with the inner wall of the reactor tube, (d.7) means connected to the water input for introducing water into the reactor chamber along at least a portion of the predetermined path of the hydrocarbon fuel, (d.8) electrical means connected to the electrical power input for directing high intensity radiant energy into the reactor chamber to coincide with at least a portion of the predetermined path of the hydrocarbon fuel, and (d.9) a gas mixture output connected to the outlet end of the reactor tube;
   e. means for metering fuel from the container into the hydrocarbon fuel input of the reactor;
   f. means for metering water from the water tank into the water input of the reactor;
   g. means for metering electrical power from the power source into the power input of the reactor, and
   h. a manifold connecting the gas mixture output of the reactor to a combustion fuel input of the internal combustion engine for directing the synthesis gas mixture from the reactor to the engine.

2. A fuel converter according to claim 1 in which the high temperature fluid-wall reactor further comprises (d.10) an inert-fluid input for an inert fluid which is substantially transparent to radiant energy for forming the fluid wall of the reactor, and in which the fuel converter further comprises:
   i. an inert-fluid tank for the inert fluid; and
   j. means for metering inert fluid from the inert-fluid tank into the inert-fluid input of the reactor.

3. A fuel converter according to claim 2 in which:
   i. the reactor tube is made of a porous refractory material capable of emitting sufficient radiant energy to raise the temperature of reactants within the reactor tube to a level required to initiate and sustain the desired fuel conversion reaction; the pores of the refractory material being of such diameter as to permit a uniform flow of sufficient inert fluid through the tube wall to constitute a protective blanket for the radially inward surface of the reactor tube; and
   ii. the electrical means include electrodes spaced radially outwardly of the reactor tube for heating the reactor tube to the temperature level at which it emits sufficient radiant energy to initiate and sustain the desired fuel conversion reaction, the radiant energy being directed centrally therewithin substantially coincident with at least a portion of the path of the hydrocarbon fuel; and in which the reactor further comprises
   d.10 a fluid-tight tubular pressure vessel enclosing the reactor tube and the electrodes to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber, the fuel input, the gas mixture output, and the inert fluid input of the reactor being connected respectively to the inlet end of the reactor tube, the outlet end of the reactor tube, and the inlet of the pressure vessel; and d.11. a circumferential heat shield disposed within the pressure vessel and radially outwardly of the heating means, the heat shield reflecting radiant energy toward the reactor tube.

4. A fuel converter according to claim 3 in which the high temperature fluid-wall reactor further includes means for introducing a radiant energy absorptive target into the reactor chamber coincident with at least one point along the path of the hydrocarbon fuel which is transparent to radiant energy, sufficient radiant energy being absorbed by the target to raise the temperature of the reactants to a leval required to initiate the desired fuel conversion reaction.

5. A fuel converter for a transportation vehicle powered by an internal combustion engine comprising:
   a. a fuel container for a hydrocarbon fuel;
   b. an inert-fluid tank for an inert fluid which is substantially transparent to radiant energy;
   c. an electric power source;
   d. a high temperature fluid-wall reactor for thermally decomposing the hydrocarbon fuel into a combustion fuel mixture containing carbon black and hydrogen, the reactor having (d.1) a fuel input, (d.2) an inert-fluid input for the inert fluid for forming the fluid wall of the reactor, (d.3) an electrical power input, (d.4) a reactor tube having an inlet end and an outlet end, the interior of the tube defining a reactor chamber, (d.5) means for generating an annular envelope of an inert fluid which is substantially transparent to radiation radially inwardly of the inner surface of the reactor tube to constitute a protective blanket for the inner surface, (d.6) means connected to the hydrocarbon input for introducing the hydrocarbon fuel into the reactor chamber through the inlet end of the reactor tube in a predetermined path axially of the reactor tube, the hydrocarbon fuel being confined by the protective blanket substantially centrally within the reactor chamber and out of contact with the inner wall of the reactor tube; (d.7) electrical means connected to the electrical power input for directing high intensity radiant energy into the reactor chamber to coincide with at least a portion of the predetermined path of the hydrocarbon fuel; and (d.8) a fuel mixture output connected to the outlet end of the reactor tube;
   e. means for metering fuel from the fuel container into the fuel input of the reactor;
   f. means for metering inert fluid from the inert-fluid tank into the inert-fluid input of the reactor;
   g. means for metering electrical power from the power source into the power input of the reactor; and
   h. a fuel mixture manifold connecting the fuel mixture output of the reactor to a combustion fuel input of the internal combustion engine for directing the combustion fuel mixture from the reactor to the engine.

6. A fuel converter according to claim 5 in which:
   i. the reactor tube is made of a porous refractory material capable of emitting sufficient radiant energy to raise the temperature of reactants within the reactor tube to a level required to initiate and sustain the desired fuel conversion reaction; the pores of the refractory material being of such diameter as to permit a uniform flow of sufficient inert fluid through the tube wall to constitute a protective blanket for the radially inward surface of the reactor tube; and
   ii. the electrical means include electrodes spaced radially outwardly of the reactor tube for heating the reactor tube to the temperature level at which it emits sufficient radiant energy to initiate and sustain the desired fuel conversion reaction, the radiant energy being directed centrally therewithin substantially coincident with at least a portion of the path of the hydrocarbon fuel; and in which the reactor further includes:
   d.9. a fluid-tight tubular pressure vessel enclosing the reactor tube and the electrodes to define an inert fluid plenum between the reactor tube and the pressure vessel, the inlet and outlet ends of the reactor tube being sealed from the plenum; the pressure vessel having an inlet for admitting the inert fluid which is directed under pressure into the plenum and through the porous tube wall into the reactor chamber, the fuel input, the gas mixture output, and the inert fluid input of the reactor being connected respectively to the inlet end of the reactor tube, the outlet end of the reactor tube, and the inlet of the pressure vessel; and
   d.10. a circumferential heat shield disposed within the pressure vessel and radially outwardly of the heating means, the heat shield reflecting radiant energy toward the reactor tube.

7. A fuel converter according to claim 6 in which the high temperature fluid-wall reactor further includes means for introducing a radiant energy absorptive target into the reactor chamber coincident with at least one point along the path of the hydrocarbon fuel which is transparent to radiant energy, sufficient radiant energy being absorbed by the target to raise the temperature of the reactants to a level required to initiate the desired fuel conversion reaction.

8. A fuel converter for a transportation vehicle powered by an internal combustion engine comprising:
   a. a container for a mixture of a hydrocarbon fuel and water;
   b. an inert-fluid tank for an inert fluid which is substantially transparent to radiant energy;
   c. an electrical power source;
   d. a high temperature fluid-wall reactor for converting the hydrocarbon fuel and water mixture into a synthesis gas mixture containing carbon monoxide and hydrogen, the reactor having (d.1) a fuel-mixture input for the hydrocarbon fuel and water mixture (d.2) an electrical power input, (d.3) a reactor tube having an inlet end and an outlet end, the interior of the tube defining a reactor chamber (d.4) means for generating an annular envelope of the inert fluid radially inwardly of the inner surface of the reactor tube to constitute a protective blanket for the inner surface, (d.5) means connected to the fuel mixture input for introducing the hydrocarbon fuel and water mixture into the reactor chamber through the inlet end of the reactor tube in a predetermined path axially of the reactor tube; the fuel mixture being confined by the protective blanket substantially centrally within the reactor chamber and out of contact with the inner surface of the reactor tube, (d.6) electrical means connected to the electrical power input for directing high intensity radiant energy into the reactor chamber to coincide with at least a portion of the predetermined path of the fuel mixture, and (d.7) a gas mixture output connected to the outlet end of the reactor tube;

e. means for metering fuel mixture from the container into the fuel mixture input of the reactor;

f. means for metering inert fluid from the inert-fluid tank into the inert-fluid input of the reactor;

g. means for metering electrical power from the power source into the power input of the reactor; and h. a manifold connecting the gas mixture output of the reactor to a combustion fuel input of the internal combustion engine for directing the synthesis gas mixture from the reactor to the engine.

* * * * *

UNITED STATES PATENT AND TRADEMARK OFFICE
CERTIFICATE OF CORRECTION

PATENT NO. : 4,036,181
DATED : July 19, 1977
INVENTOR(S) : EDWIN MATOVICH

It is certified that error appears in the above-identified patent and that said Letters Patent are hereby corrected as shown below:

1. Column 3, line 32, "engine. FIG. 2A" should read --engine.
   FIG. 2A--.

2. Column 5, line 5, "watergas" should read --water-gas--.

3. Column 5, line 28 "becaume" should read --became--.

4. Column 5, line 51 "application" should read --applications--.

Signed and Sealed this

Twenty-first Day of March 1978

[SEAL]

Attest:

RUTH C. MASON
Attesting Officer

LUTRELLE F. PARKER
Acting Commissioner of Patents and Trademarks